United States Patent
Gabonay et al.

(10) Patent No.: US 12,430,970 B2
(45) Date of Patent: Sep. 30, 2025

(54) REMOTE DESKTOP SUPPORT KIOSK AND DISPENSER

(71) Applicant: INTERNATIONAL VENDING MANAGEMENT, INC., Indianapolis, IN (US)

(72) Inventors: Jeffrey Gabonay, Noblesville, IN (US); Andrew S. Dalton, Greencastle, IN (US); James Nathan Guffey, Greencastle, IN (US); Larry M. Pitts, Fishers, IN (US); Wudneh W. Akalu, Indianapolis, IN (US); David R. Sutton, Fishers, IN (US); Tyler G. Sutton, Westfield, IN (US)

(73) Assignee: INTERNATIONAL VENDING MANAGEMENT, INC., Indianapolis, IN (US)

( * ) Notice: Subject to any disclaimer, the term of this patent is extended or adjusted under 35 U.S.C. 154(b) by 246 days.

(21) Appl. No.: 17/906,426

(22) PCT Filed: Mar. 15, 2021

(86) PCT No.: PCT/US2021/022337
§ 371 (c)(1),
(2) Date: Sep. 15, 2022

(87) PCT Pub. No.: WO2021/188424
PCT Pub. Date: Sep. 23, 2021

(65) Prior Publication Data
US 2023/0196858 A1    Jun. 22, 2023

Related U.S. Application Data

(60) Provisional application No. 62/990,655, filed on Mar. 17, 2020.

(51) Int. Cl.
*G07C 9/00* (2020.01)
*G06F 21/32* (2013.01)

(52) U.S. Cl.
CPC ......... *G07C 9/00896* (2013.01); *G06F 21/32* (2013.01)

(58) Field of Classification Search
CPC ..... G07C 9/00896; G06F 21/32; G06F 21/44; G06Q 20/18; G06Q 20/322; G07F 7/06;
(Continued)

(56) References Cited

U.S. PATENT DOCUMENTS 9,256,997 B2    2/2016  Rutledge et al.
2008/0252414 A1  10/2008  Crigger et al.
(Continued)

FOREIGN PATENT DOCUMENTS

WO    20190212515    11/2019
WO    WO2019212515   11/2019

OTHER PUBLICATIONS

Supplementary European Search Report for EP21772571 dated Feb. 14, 2023.
(Continued)

*Primary Examiner* — Omeed Alizada
(74) *Attorney, Agent, or Firm* — Barnes & Thornburg LLP

(57) ABSTRACT

A kiosk includes a work surface and a storage container coupled to the work surface. A hardware-control device is coupled to the kiosk to allow for remote troubleshooting of hardware at the kiosk. The storage container includes a plurality of storage lockers that can store and dispense hardware if troubleshooting the device at the kiosk is unsuccessful.

18 Claims, 7 Drawing Sheets

(58) Field of Classification Search
CPC . G07F 9/001; G07F 9/002; G07F 9/10; G07F 11/62; G07F 17/0042; G07F 17/10; G07F 17/12; H04M 3/567
See application file for complete search history.

(56) References Cited

U.S. PATENT DOCUMENTS

| | | | |
|---|---|---|---|
| 2019/0066073 A1 | 2/2019 | Yen et al. | |
| 2021/0326147 A1* | 10/2021 | Shelton | G06Q 20/18 |
| 2022/0004999 A1* | 1/2022 | Nottingham | G06Q 20/18 |

OTHER PUBLICATIONS

PCT Search Report and Written Opinion prepared for PCT Application No. PCT/US2021/022337, completed May 10, 2021.

* cited by examiner

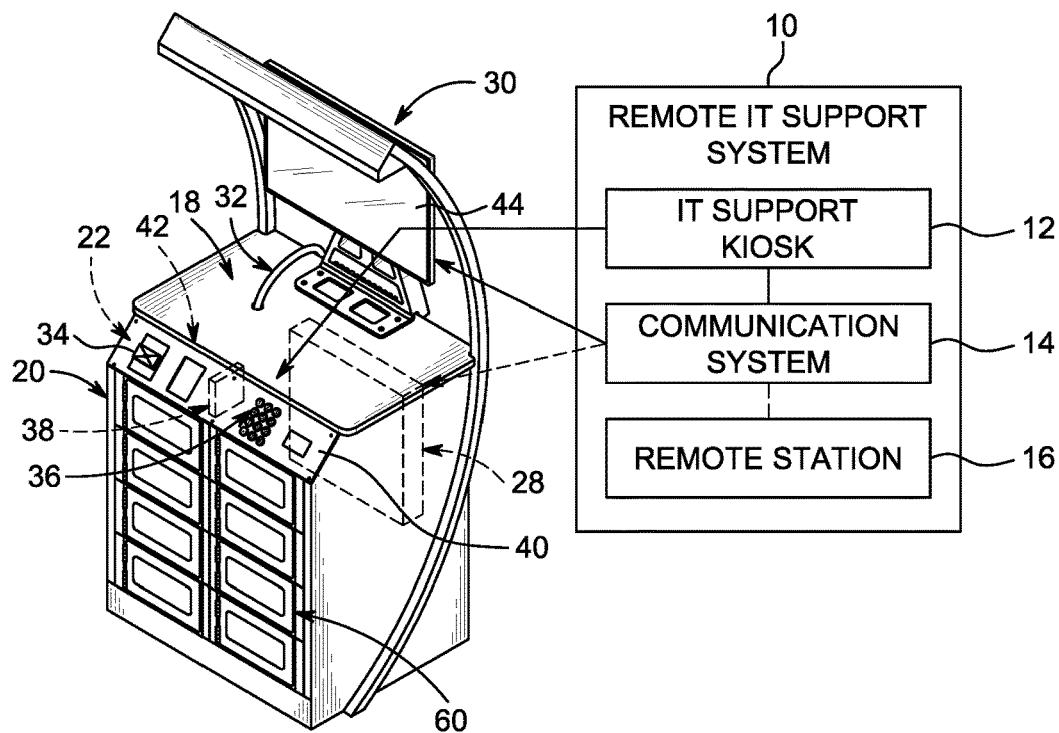
FIG. 1
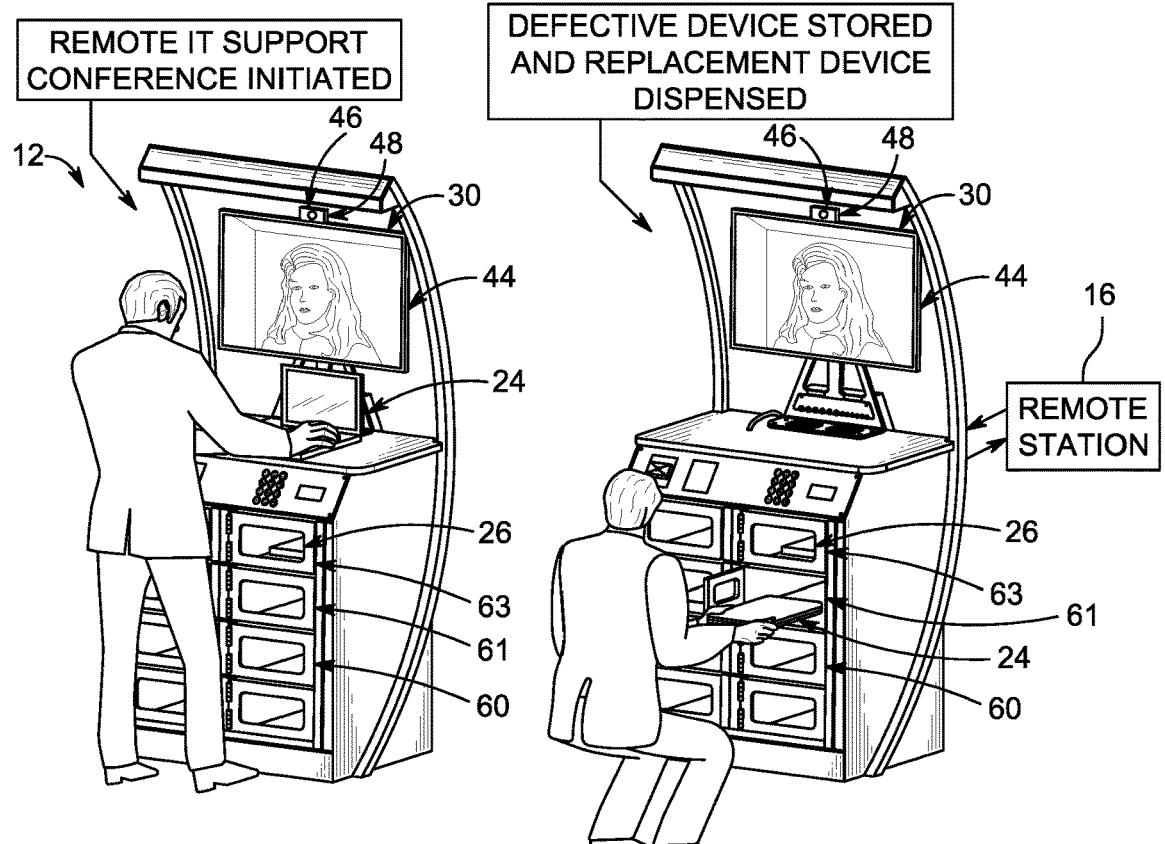
FIG. 2
FIG. 3

REMOTE DESKTOP SUPPORT KIOSK AND DISPENSER

CROSS-REFERENCE TO RELATED APPLICATIONS

This application is the U.S. national phase of PCT/US2021/022337, filed on Mar. 15, 2021, which claims priority under 35 U.S.C. § 119(e) to U.S. Provisional Application Ser. No. 62/990,655 filed on Mar. 17, 2020, the entire disclosures of which are incorporated herein by reference.

BACKGROUND

The present disclosure relates to a kiosk, and in particular to a kiosk with a work surface. More specifically, the present disclosure relates to a kiosk including a work surface and at least one storage locker.

SUMMARY

The present disclosure includes one or more of the features recited in the appended claims and/or the following features which, alone or in any combination, may comprise patentable subject matter.

According to the present disclosure, an information technology (IT) support system includes an IT support kiosk. The IT support kiosk includes, a storage container having a plurality of storage lockers, and an access control system coupled to the plurality of storage lockers.

In some embodiments, the IT support kiosk includes a work surface. In some embodiments, the storage container is coupled to the work surface.

In some embodiments, the IT support system further includes a communication system coupled to the IT support kiosk. The communication system may include a conference system coupled to the work surface, a hardware-control device coupled to the storage container, and an interface configured to couple hardware to the hardware-control device to allow troubleshooting of the device from a remote location. In some embodiments, the conference system may include a monitor mounted to the work surface, a webcam, and a microphone. The interface may be a wired connection in some embodiments or a wireless connection.

In some embodiments, the IT support system further may include a remote station in communication with the hardware-control device and the access-control system. The remote station is configured to output a first command signal to the access control system to cause the access control system to open an available locker of the plurality of lockers in response to receipt of a validation signal from the remote station. The remote station is also configured to output a second command signal to the access control system to cause the access control system to open an occupied locker housing a replacement device upon receipt of a confirmation signal from the access control system indicative that the available locker is closed.

In some embodiments, the access control system may include a scanner coupled to a front panel of the storage container, a keyboard coupled to the front panel of the storage container, and a printed circuit board located within an interior region defined by the storage container.

In some embodiments, the access control system is configured to output an identifier signal to the remote station in response to at least one of scanned badge by the scanner, a keyed entry into the keyboard, and connection between the hardware and the hardware-control device.

In some embodiments, if the identifier signal is accepted by the remote station, the remote station outputs the validation signal. The identifier signal may be output automatically upon connection of the hardware to the hardware-control device through the interface.

In some embodiments, the storage container may include a container housing and a modular locker unit. The storage container is configured to support the work surface above ground and that defines a main compartment. The modular locker unit is arranged within the main compartment and may include the plurality of storage lockers and a locker retainer configured to fix each of the plurality of storage lockers to the container housing.

In some embodiments, the locker retainer may include a plurality of rods that extend vertically through apertures formed in the container housing and each of the plurality of storage lockers. The rods may be removable from the container housing and the plurality of storage lockers so that at least one locker can be separated from the modular locker unit and replaced with a new locker.

According to another aspect of the present disclosure, the IT support system provides a method of troubleshooting hardware from a remote location. The method may include providing an IT support kiosk having a work surface configured to support the hardware. In some embodiments, the method may include verifying that a user is authorized to initiate a remote IT support conference using the IT support kiosk. In some embodiments, the method may include initiating the remote IT support conference using a communication system coupled to the IT support kiosk. The communication system may include a conference system coupled to the work surface, a hardware-control device, and an interface configured to couple the hardware to the hardware-control device.

In some embodiments, the method may include troubleshooting the device from a remote location. In some embodiments, if the step of troubleshooting is unsuccessful, the method further may include storing the hardware in a storage locker coupled to the IT support kiosk so that an IT technician may retrieve the hardware at a later time for in-person troubleshooting.

In some embodiments, the step of storing the hardware may include verifying that the user is authorized to store the hardware in the storage locker by outputting an identifier signal to a remote station and receiving a command signal from the remote station that causes the storage locker to open automatically.

In some embodiments, the IT support kiosk may include a plurality of storage lockers. At least one of the storage lockers may house replacement hardware and the method may further include dispensing the replacement hardware to the user. In some embodiments, the step of dispensing the replacement hardware further may include verifying that the user is authorized to receive the replacement device.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 1 is a perspective and diagrammatic view of a remote IT support system including a IT support kiosk with an integrated communication system to communicate with a user and accessing the user's device for remote IT support, as shown in FIG. 2, or to store the device in an integrated storage locker, as suggested in FIG. 3, so that the device can be retrieved at a later date for in-person IT support;

FIG. 2 is a perspective and diagrammatic view of the IT support kiosk of FIG. 1 showing a user initiating a remote IT support conference with an IT technician through the communication system;

FIG. 3 is a perspective and diagrammatic view of the IT support kiosk of FIGS. 1 and 2 showing the user storing the device in an available locker that has been opened in response to a remote station outputting a command signal to the IT support kiosk;

DETAILED DESCRIPTION

Figure 4:
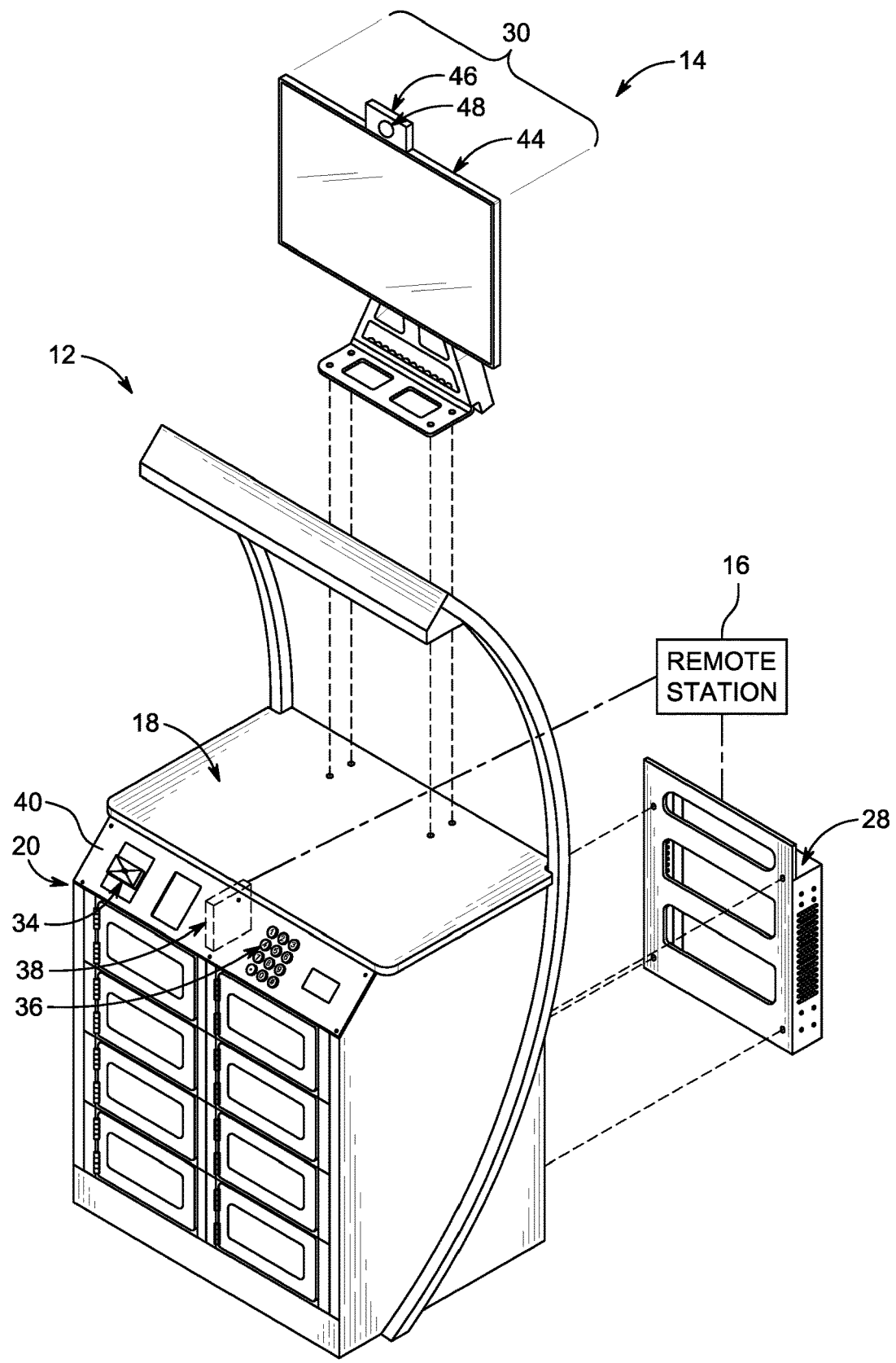
FIG. 4 is an exploded assembly and diagrammatic view of the IT support kiosk showing that the communication system includes a KVM switch mounted to the IT support kiosk to connect to devices and allow for remote control of the devices during the remote IT support conference.

A remote information technology (IT) support system 10 in accordance with the present disclosure includes an IT support kiosk 12, a communication system 14, and remote station 16 as shown in FIGS. 1-3. Users can bring hardware 24 to the IT support kiosk 12 and initiate a remote IT support conference with a remote IT technician through the communication system 14 to assist with troubleshooting the hardware 24 as suggested in FIG. 2. If the IT issue is not resolved during the remote IT support conference, the device may be stored in a locker 60 included in the IT support kiosk 12 for subsequent retrieval and in-person troubleshooting by an IT technician. The IT support kiosk 12 may be used to store one or more replacement devices so that, when an IT issue with hardware 24 is not solved, the user may store the defective hardware 24 in an available locker 61, as shown in FIG. 3, and may retrieve replacement hardware 26 from an occupied locker 63.

The IT support kiosk 12 includes a work surface 18, a storage container 20, and an access control system 22 as shown in FIG. 1. The work surface 18 is a flat panel or board where the user can bring hardware 24, such as a laptop, tablet, cell phone, etc., to the remote IT support kiosk 12 for service as suggested in FIG. 2. The storage container 20 is coupled to the work surface 18 and includes at least one storage locker 60 for storing various devices such as hardware 24 or replacement hardware 26. The storage container 20 is configured to support the work surface 18 above ground while providing for space between the work surface and the ground for the storage locker 60. The access control system 22 is configured to accept a user identifier input into the IT support kiosk by a user, such as by inputting a code or through automatic recognition of the user identifier such as a barcode or RFID badge, for example. The access control system 22 is configured to open the storage locker 60 and/or dispense the replacement hardware 26 in response to acceptance of the user identifier and verification that the user is authorized to store the hardware 24 in the locker 60 and/or retrieve the replacement hardware 26.

When a user brings hardware 24 to the work surface 18, the user may initiate the remote IT support conference by connecting the hardware 24 to the communication system 14. The communication system 14 includes a keyboard, video, and mouse switch (KVM) 28, a conference system 30, and an interface 32. The KVM switch 28, also called a hardware-control device, provides access to and control of the hardware 24. The KVM switch 28 is connected to a network that allows a technician to troubleshoot the hardware 24 through the communication system 14 from a remote location. The conference system 30 allows the user and the remote IT technician to communicate with one another while the IT technician accesses and troubleshoots the hardware 24 through the KVM switch 28 during the remote IT support conference. The hardware 24 is connected to the KVM switch 28 by the interface 32 which may include a cable as shown in FIG. 1-3, or a wireless interface such as through RFID, WIFI®, BLUETOOTH®, ultra-wideband (UWB), or any other suitable wireless connection. It should be noted that a wireless connection between the KVM switch 28 and the hardware 24 may use one or more antennas, transceivers, tags, readers, etc. in order to relay control signals and/or data between the KVM switch 28 and the hardware 24 during the remote IT support conference.

Figure 5:
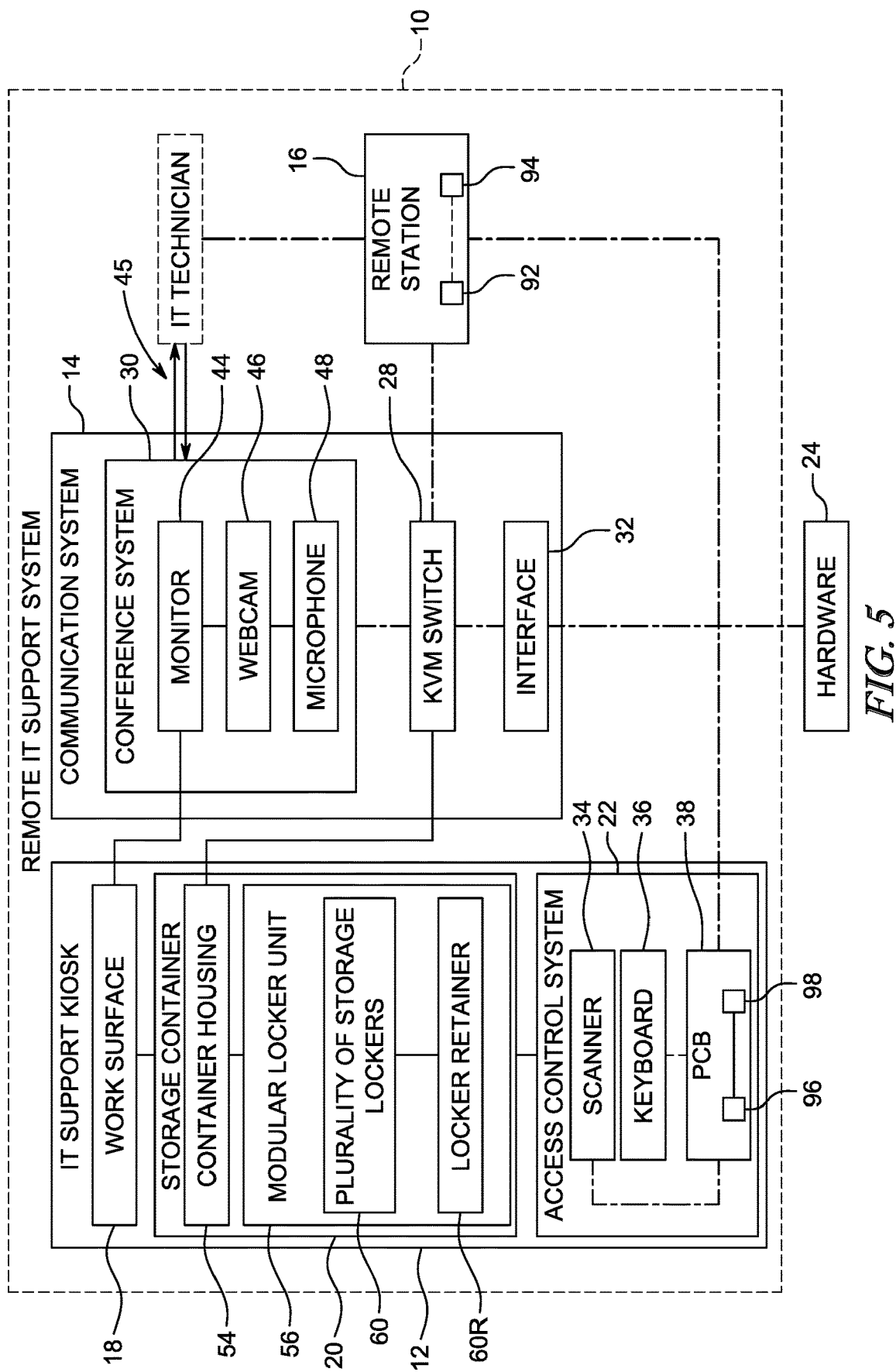
FIG. 5 is a diagrammatic view of the remote IT support system of FIG. 1.

The access control system 22 initiates the remote IT support conference and controls opening of the locker 60 depending on results of the remote IT support conference as suggested in FIGS. 2 and 3. The access control system 22 includes a scanner 34, a keyboard 36, and a printed circuit board (PCB) 38 as shown in FIGS. 1 and 5. The scanner 34 is coupled to a front panel 40 of the storage container 20 so that it is visible and assessable by a user wishing to use the remote IT support system 10. In some embodiments, the scanner 34 may be coupled to other areas of the storage container 20 or the work surface 18. The keyboard 36 is also coupled to the front panel 40 of the storage container 20. The PCB 38 is located within an interior region 42 of the storage container 20 so that it is not accessible except for service, if needed. The PCB 38 is electrically coupled to one or more storage lockers 60 and is configured to unlock the one or more storage lockers 60 upon receipt of a validation signal from the remote station 16. The access control system 22 may include a plurality of PCBs 38 designated for separate groups of the lockers 60. Each of the PCBs 38 may be communicatively coupled to one another so that they control opening of the lockers 60 between one another.

The remote IT support conference may be initiated using the conference system 30 and/or the access control system 22. The conference system 30 includes a monitor 44, a webcam 46, and a microphone 48 as shown in FIG. 5. The monitor 44 is mounted on the work surface 18. In some embodiments, the monitor 44 includes a touchscreen display. A user may interact with the touchscreen display to initiate the remote IT conference such as by following a series of prompts displayed by the monitor. The scanner 34 and the keyboard 36 may be used together or separately to authenticate a user's identity so that one or more storage lockers may be unlocked for the storage of a hardware 24 or retrieval of a replacement hardware 26 as shown in FIGS. 2 and 3.

In some embodiments, the user may be required to provide a user identifier by inputting a code into the keyboard 36 or through automatic recognition of the user identifier by scanning a barcode or RFID badge using the scanner 34 to authenticate their identity and authorize their access to initiate the remote IT support conference. In some embodiments, both a keyed input in the keyboard 36 and scanning a barcode or RFID badge with the scanner 34 may be required prior to initiating the remote IT support conference. In some embodiments, the user's hardware 24 may also include a user identifier such that when the hardware 24 is connected to the KVM switch 28 through interface 32 their identity and/or authorization is automatically recognized and the remote IT support conference is automatically initiated in response.

The remote station 16 is a server located in remote location from the remote IT support kiosk 12 and is electrically coupled to both the KVM switch 28 and the PCB 38 as shown in FIGS. 4 and 5. The remote station 16 includes at least one microprocessor 90 and a memory storage device 92 that stores instructions and data associated with the remote IT support kiosk 12. The microprocessor 90 receives the user identifier from the remote IT support kiosk 12 and accesses the data stored in the memory storage device 92 to determine if the user is authorized to use the IT support kiosk 12 and the communication system 14. If the user identifier is determined to be acceptable, the remote station 16 outputs a command signal to IT support kiosk 12 to initiate the remote IT support conference. The PCB 38 also includes a microprocessor 96 and a memory storage unit 98. The memory storage unit 98 includes instructions that, when executed by the microprocessor 96 in response to receipt of a command signal from the remote station 16, causes the microprocessor 96 to open one or more of the storage lockers 60.

Once the remote IT support conference is initiated, the user may communicate with a remote IT technician through the conference system 30 using the monitor 44, the webcam 46, and the microphone 48 while their hardware 24 is connected to the KVM switch 28 to troubleshoot the hardware 24. The conference system 30 provides for two-way communication with the IT technician as suggested by arrows 45 in FIG. 5. For example, the user may ask and answer questions about the hardware 24 and the issues experienced by the hardware 24 to assist the remote technician with troubleshooting the hardware 24 during the remote IT support conference.

Figure 6:
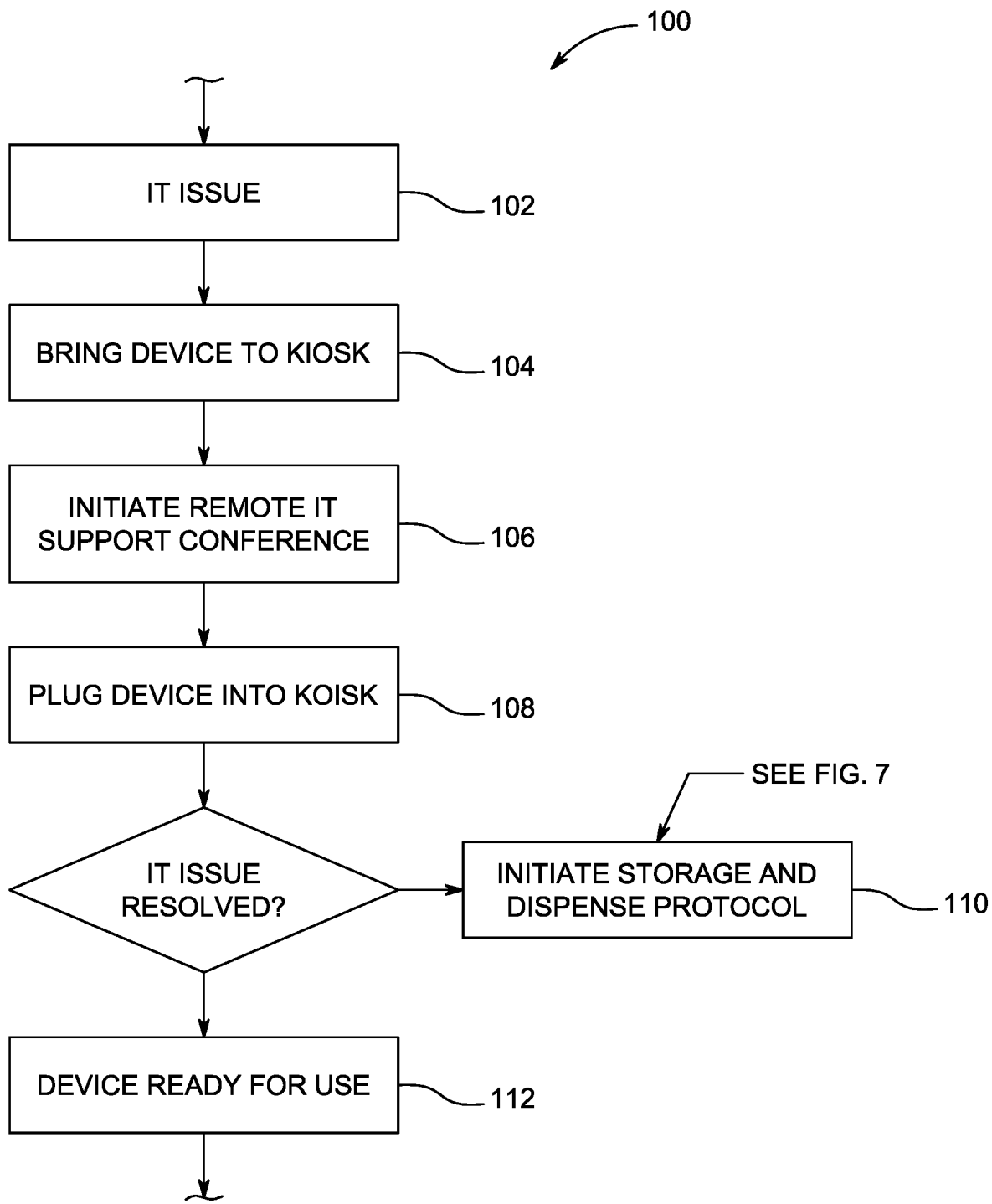
FIG. 6 is a diagrammatic view of a flowchart illustrating a process for using the IT support system for troubleshooting a device.
Figure 7:
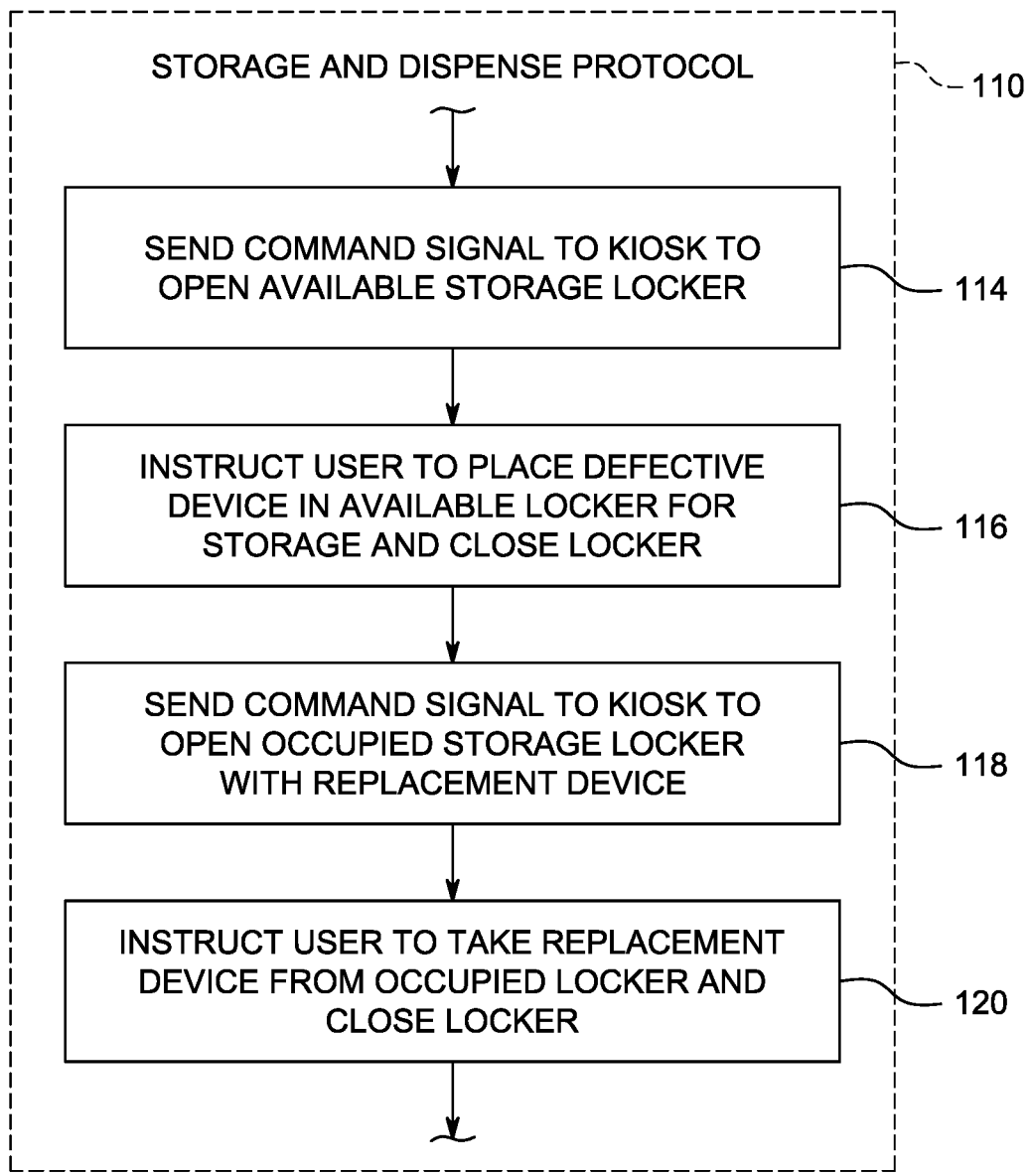
FIG. 7 is a diagrammatic view illustrating a storage and dispense protocol initiated as a sub-process to the flowchart shown in FIG. 6 when a device is to be stored in a locker for retrieval at a later time and dispensing of a replacement device.

A process 100 for resolving an IT issue using the remote IT support system 10 is shown in FIGS. 6 and 7. The process begins with a user's hardware 24 experiencing an IT issue as suggested at step 102. The IT issue may occur in a location where an IT technician is not easily accessible for in-person device troubleshooting to resolve the issue. However, the user may be at a location where the IT support kiosk 12 is accessible to connect remotely with an IT technician for remote troubleshooting to resolve the issue. The user may bring the hardware 24 to the remote IT kiosk 12 at a step 104. Once the user is at the remote IT support kiosk 12, the user may initiate the remote IT support conference with the remote IT technician at step 106. The user may then connect the hardware 24 to the KVM switch 28 at a step 108 so that the remote IT technician can access and control the user's hardware 24 during the remote IT support conference. If the issues being experienced by the hardware 24 are resolved during the remote IT support conference, the user may disconnect the hardware 24 from the KVM switch 28 and return to normal activities with the hardware 24 at a step 112.

If the issues being experienced by the hardware 24 are not able to be resolved during the remote IT support conference, the remote IT technician or the user may initiate a storage and dispense protocol at a step 110 as shown in FIGS. 6 and 7. During the storage and dispense protocol, the user is able to store the defective device in one of the lockers 60 and may be issued a replacement hardware 26. The remote technician may initiate the storage and dispense protocol by providing an input into to the remote station 16 that causes the remote station 16 to output command signals to the IT support kiosk 12. Alternatively, the user may initiate the storage and dispense protocol by inputting a request into the communication system 14 which is then relayed to the remote station and causes the remote station 16 to output command signals to the IT support kiosk 12.

The remote station 16 is configured to control opening of the lockers 60 in response to user inputs and verification of the user's authority to access the lockers 60 during the storage and dispense protocol as shown in FIG. 7. The remote station 16 outputs a command signal to the PCB 38 in response to the storage and dispense protocol being initiated. The command signal instructs the PCB 38 to unlock and open an available locker 61 at step 114. The defective hardware 24 may be placed in the available locker 61 for storage until an IT technician is available to retrieve the defective hardware 24 at a later time for in-person troubleshooting. The user may be required to re-verify their identity prior to the available locker 61 being opened. The re-verification may be completed in the same manner used to initiate the remote IT support conference such as by scanning an RFID badge using scanner 34, by inputting a user-specific identifier code into keyboard 36, and/or automatically through recognition of an identifier associated with the user's hardware 24. If reverification is required, another user identifier signal is sent to the remote station 16 for verification that the user is authorized to access the available locker 61 and store the hardware 24 therein.

As a part of step 114, the user may select a locker to store the hardware 24 by inputting an identifier code into the keyboard 36 that corresponds with a particular locker included in the plurality of lockers 60. The remote station 16 is configured to determine if the selected locker is available by accessing its memory 94. If the selected locker is available, the remote station 16 sends a command signal to the PCB 38, which then opens the selected locker to store the hardware 24 therein. If the selected locker is not available, i.e. it is occupied or an error occurs, the remote station 16 sends a command signal to the IT support kiosk 12 or the communication system 14 to display a message to the user that the selected locker is unavailable and another locker should be chosen.

The remote station 16 may also output a command signal to the IT support kiosk 12 or the communication system 14 to provide an instruction or message to the user to place the defective device in the available locker 61 and to close the locker at step 116 as shown in FIG. 7. The PCB 38 is configured to recognize when the locker 60 is closed and send a confirmation signal to the remote station 16 indicative that the available locker 61 is now closed and occupied. The remote station 16 is configured to store this information along with identifier information about the device stored therein so that the correct device can be retrieved from the locker 60 at a later time. The identifier information may be a serial number for the hardware, an employee identification number, or any other suitable identifier linking the hardware, the user, and the locker where the hardware 24 is stored.

If an instruction or a request is input made by the IT technician or the user to issue a replacement hardware 26, the remote station 16 sends a second command signal to the PCB 38 to instruct the PCB 38 to open an occupied locker 63 containing the replacement hardware 26 at step 118 as shown in FIG. 7. The second command signal is sent to the PCB 38 in response to the confirmation signal from the PCB 38 indicating that the locker 61 now containing the defective hardware 24 is closed. The user may be required to re-verify their identity prior to the occupied locker 63 being opened. The re-verification may be completed in the same manner used to initiate the remote IT support conference such as by scanning an RFID badge using scanner 34, by inputting a user-specific identifier code into keyboard 36, and/or automatically through recognition of an identifier associated with the user's hardware 24. If reverification is required, another user identifier signal is sent to the remote station 16 for verification that the user is authorized to access the occupied locker 63 and retrieve the replacement hardware 26 therein.

The remote station 16 may also output a command signal to the IT support kiosk 12 or the communication system 14 to provide an instruction to the user to close the opened locker at step 120 as shown in FIG. 7. The PCB 38 is configured to recognize when the locker 63 is closed and send a second confirmation signal to the remote station 16 indicative that the locker 63 is now available. The remote station 16 is configured to store this information so that the available locker 61 can be accessed by a subsequent user to store other hardware in the future.

Steps 114 and 118 are completed separately to increase security of the process 100 by minimizing the user's ability to retrieve replacement hardware 26 while still maintaining possession of hardware 24. However, in some embodiments, steps 114 and 116 may be completed at the same time by opening an occupied locker 63, allowing the user to retrieve the replacement hardware 26 from occupied locker 63, and then storing the defective hardware 24 in the same locker that was occupied by the replacement hardware 26.

The storage container 20 includes a container housing 54 and a modular locker unit 56 that includes the at least one storage locker 60 as shown in FIGS. 1-5. The container housing 54 supports many of the components of the remote IT support system such as the work surface 18 and the communication system 14. The container housing 54 is made from a plurality of panels that define a main compartment 58. The modular locker unit 56 is coupled to the container housing 54 and is located within the main compartment 58. The KVM switch 28 is mounted to the container housing 54 in close proximity to the work surface 18 and the hardware 24 brought to the work surface 18. The KVM switch 28 mounted to the container housing 54 using a separate KVM housing 50 that is mounted on a rear surface 52 of the container housing as suggested in FIG. 1 and shown in FIG. 4. In some embodiments, the KVM switch 28 may be mounted to another surface of the storage container 20 or may be separate from remote IT kiosk 12 so long as the KVM switch 28 is able to connect to and communicate with devices brought to the work surface 18.

Figure 8:
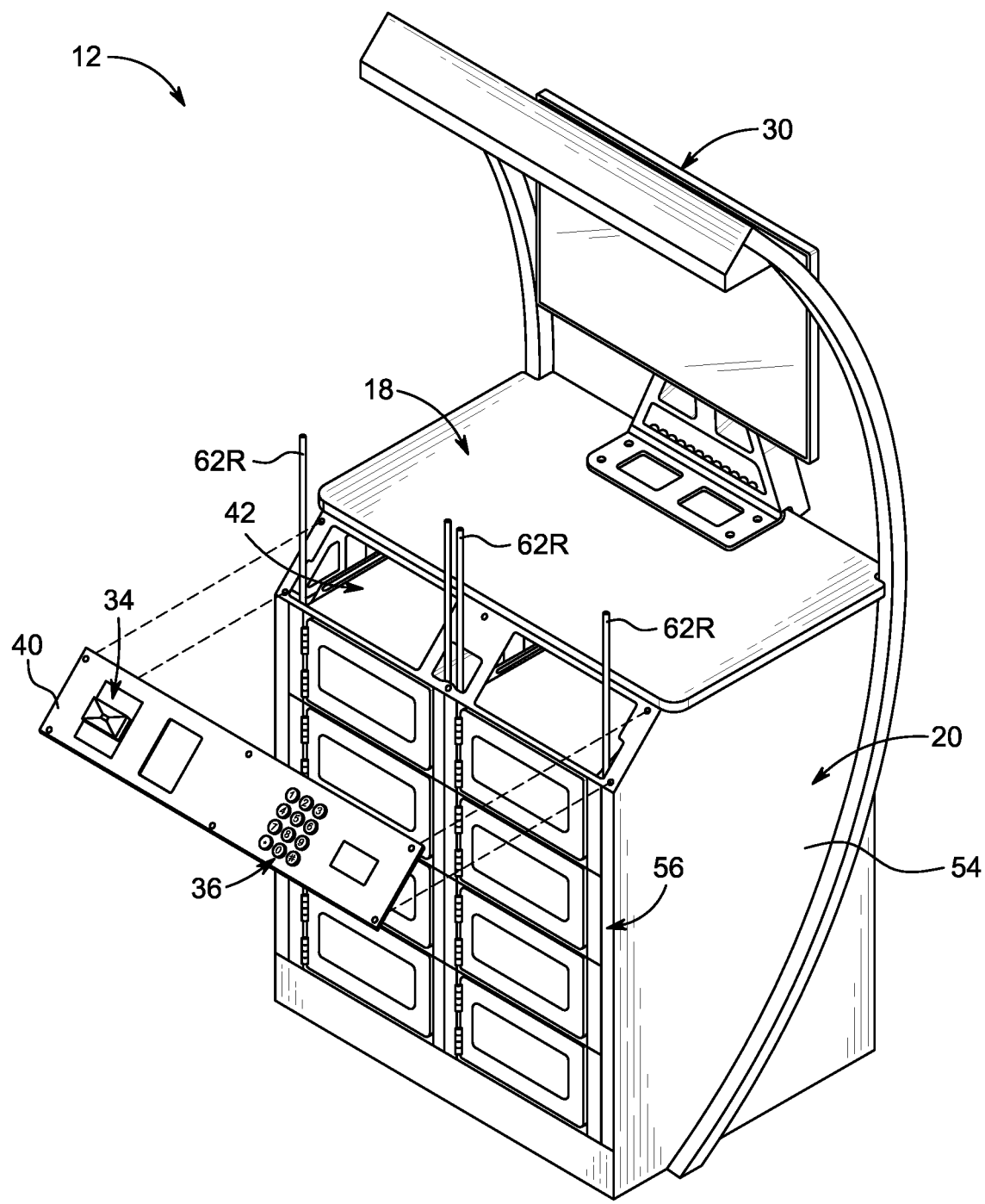
FIG. 8 is a partial exploded view of the remote IT support kiosk suggesting that one or more lockers of the IT support kiosk can be removed and/or added to provide a modular locker unit.

The modular locker unit 56 is normally fixed to the container housing 54 as shown in FIGS. 1-4, but may be uninstalled by a technician to change the visual appearance and functionality of the modular locker unit 56. The modular locker unit 56 includes a plurality of storage lockers 60 and locker retainer 62 as shown in FIGS. 5 and 8. The plurality of storage lockers 60 are stacked and/or positioned side-by-side one another within the main compartment 58 of the container housing 54. The locker retainer 62 includes one or more rods 62R that are configured to retain each of the plurality of storage lockers 60 to the container housing 54. The rods 62R may be removed from the container housing 54 when the front panel 40 is uninstalled, as shown in FIG. 8, so that one or more of the storage lockers 60 can be separated from the container housing 54. Lockers with varying heights may be added or removed from the container housing 54 in this manner to accommodate devices of varying sizes. One example of a modular locker system that may be used is shown and described in U.S. Pat. No. 10,039,380, issued on Aug. 7, 2018, which is expressly incorporated by reference herein for the purpose of describing modular lockers and supporting components for coupling the modular lockers together to form the modular locker unit 56.

Figure 9:
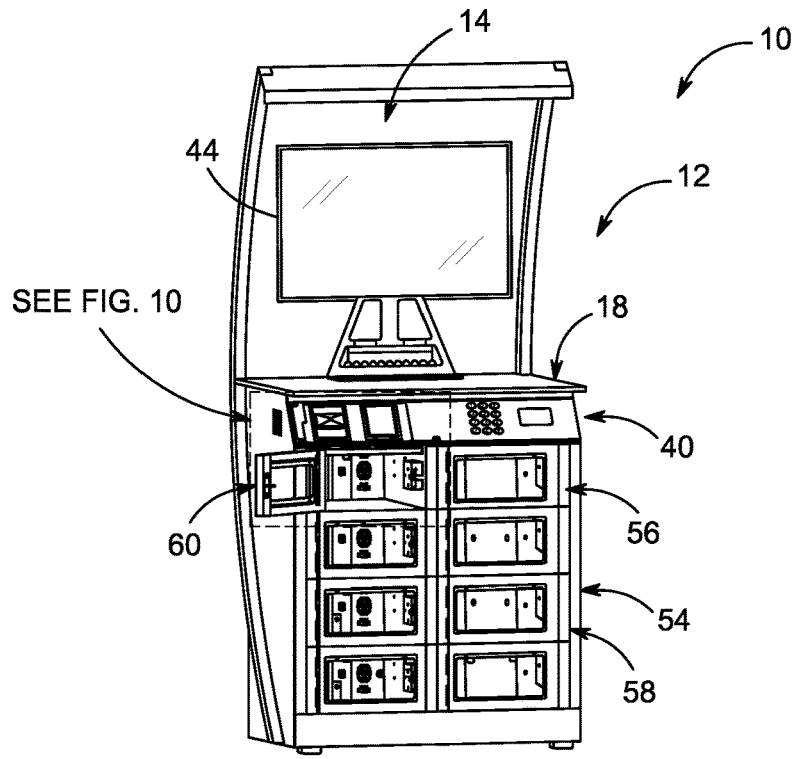
FIG. 9 is a perspective view of the IT support kiosk with one of the lockers opened.
Figure 10:
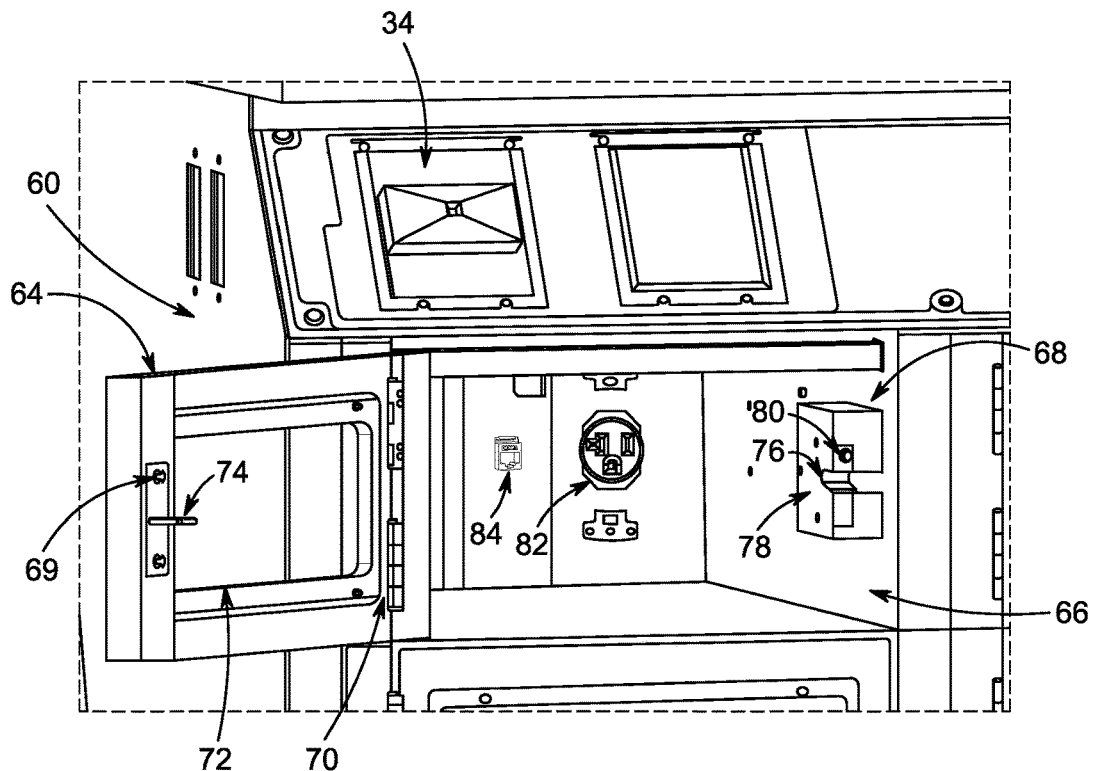
FIG. 10 is an enlarged view of a portion of FIG. 9 showing the locker in the opened position.

The modular lockers 60 each include a door 64, a locker compartment 66, and a lock assembly 68 as shown in FIGS. 9 and 10. The door 64 is hingedly attached to the locker compartment 66 and is arranged to control access to an interior product storage region formed in the locker compartment 66. The lock assembly 68 is located within the locker compartment 66 and is configured to secure the door 64 to the locker compartment 66 to block access to the contents located within an interior product storage region of each locker 60. To accommodate a variety of goods located within the interior product storage region, the modular lockers 60 can be produced in incremental heights.

The door 64 of the modular locker 60 includes a hinge 70, optionally a window 72, and a hook 74 as shown in FIGS. 9 and 10. The hinge 70 is located along an exterior surface of the door 64 and couples the door 64 to the front face of the modular locker 60 as shown in FIG. 10. The window 72 is optionally included in the door 64 and allows users to view the contents of the interior product storage region of each locker 60. The hook 74 is located on an interior surface of the door 64 and secures the door 64 to the lock assembly 68, as shown in FIG. 6. Upon a user unlocking the modular locker 60, the hook 74 is released from the lock assembly 68 and the door 64 pivots relative to the container housing 54 on the hinge 70.

The hook 74 is located on the interior surface of the door 64 as shown in FIG. 10. The hook 74 extends in rearward direction at a generally perpendicular angle to the door 64 to interact with the lock assembly 68. Illustratively, the hook 74 is generally c-shaped, although any other type of securable hook shape can be used to secure the door 64 to the lock assembly 68. The hook 74 is coupled to the door 64 with a set of fasteners 69, or alternatively a weld in some embodiments. In an illustrative embodiment, the hook 74 is adjustable to properly seat with the lock assembly 68.

The lock assembly 68 includes a lock 76, a lock cover 78, and a rod 80 The lock cover 78 is configured to locate the lock 76 between the lock cover 78 and the a sidewall of the locker compartment 66 to prevent any damage to the lock 76 during use. The lock 76 secures the door 64 to the locker compartment 66. The lock 76 is electronically controlled by the PCB 38 located in an upper compartment of the container housing 54, as shown in FIG. 1. When a user is determined to have authority to access the lockers 60 and the command signal is sent to the PCB 38 by the remote station 16, the PCB 38 sends a signal to lock 76 to release the hook 74 of the door 64. The rod 80 is spring loaded and provides a force to the door 64 to partially open the door 64. The lock 76 is connected to the PCB 38 via cabling that extends through a cabling section of the container housing 54. Illustratively, the lock 76 is coupled to a side wall of the locker compartment 66 opposite the hinge 70 as shown in FIG. 10.

Each locker compartment 66 further includes a power outlet 82 and an Ethernet port 84 as shown in FIG. 10. Devices stored in the lockers 60 may be connected to the power outlet 82 to charge and to the Ethernet port 84 for data transfer or other connection methods. In some embodiments, the KVM switch 28 may be connected to the Ethernet port 84 such that the remote IT technician may continue troubleshooting a device stored in a locker 60 after the user has deposited the device and left the kiosk 12.

Although this disclosure refers to specific embodiments, it will be understood by those skilled in the art that various changes in form and detail may be made without departing from the subject matter set forth in the accompanying claims.

What is claimed is:

1. An information technology (IT) support system comprising
    an IT support kiosk including a work surface, a storage container having a plurality of storage lockers, and an access control system coupled to the plurality of storage lockers,
    a communication system coupled to the IT support kiosk, the communication system including a conference system, a hardware-control device coupled to the storage container, and an interface configured to couple hardware to the hardware-control device to allow troubleshooting of the hardware from a remote location, and
    a remote station in communication with the hardware-control device and the access-control system,
    wherein the remote station is configured to output a first command signal to the access control system to cause the access control system to open an available locker of the plurality of lockers in response to receipt of a validation signal from the remote station, and the remote station is configured to output a second command signal to the access control system to cause the access control system to open an occupied locker housing a replacement device upon receipt of a confirmation signal from the access control system indicative that the available locker is closed,
    wherein the access control system is configured to automatically output an identifier signal to the remote station in response to a connection between the hardware and the hardware-control device through the interface,
    wherein, if the identifier signal is accepted by the remote station, the remote station outputs the validation signal, and
    wherein a remote IT support conference is initiated by the hardware-control device automatically and presented through the monitor in response to connection of the hardware to the hardware-control device through the interface.

2. The IT support system of claim 1, wherein the access control system includes a scanner coupled to a front panel of the storage container, a keyboard coupled to the front panel of the storage container, and a printed circuit board located within an interior region defined by the storage container.

3. The IT support system of claim 2, wherein the access control system is configured to output an identifier signal to the remote station in response to at least one of scanned badge by the scanner, or a keyed entry into the keyboard.

4. The IT support system of claim 1, wherein the interface is a wired connection.

5. The IT support system of claim 1, wherein the interface is a wireless connection.

6. The IT support system of claim 1, wherein the conference system includes a monitor, a webcam, and a microphone.

7. The IT support system of claim 1, wherein the storage container includes a container housing configured to support the work surface above ground and that defines a main compartment, and a modular locker unit arranged within the main compartment and including the plurality of storage lockers and a locker retainer configured to fix each of the plurality of storage lockers to the container housing.

8. The IT support system of claim 7, wherein the locker retainer includes a plurality of rods that extend vertically through apertures formed in the container housing and each of the plurality of storage lockers and that are removable from the container housing and the plurality of storage lockers so that at least one locker can be separated from the modular locker unit and replaced with a new locker.

9. The IT support system of claim 1, wherein the conference system includes a monitor mounted on an upper surface of the work surface, a webcam mounted on the monitor, and a microphone.

10. The IT support system of claim 9, wherein the access control system includes a scanner coupled to a front panel of the storage container, a keyboard coupled to the front panel of the storage container, and a printed circuit board located within an interior region defined by the storage container.

11. The IT support system of claim 10, wherein conference system provides two-way communication between a user at the IT support kiosk and an IT technician at the remote station, and wherein the hardware-control device is configured to access and troubleshoot the hardware from the remote station.

12. The IT support system of claim 1, wherein the storage container is arranged to lie entirely below the work surface and to support the work surface above ground.

13. The IT support system of claim 12, wherein the storage container includes a front panel coupled to a front end of the work surface a container housing that defines a main compartment, and a modular locker unit arranged within the main compartment and including the plurality of storage lockers and a plurality of rods that extend vertically through apertures formed in the container housing and each of the plurality of storage lockers, and wherein the front panel and each of the plurality of rods are removable from the container housing and the plurality of storage lockers so that at least one locker can be separated from the modular locker unit and the container housing and replaced with a new locker.

14. A method of troubleshooting hardware from a remote location, the method comprising
    providing an information technology (IT) support kiosk configured to support the hardware,
    verifying that a user is authorized to initiate a remote IT support conference using the IT support kiosk,
    initiating the remote IT support conference using a communication system coupled to the IT support kiosk, the communication system including a conference system, a hardware-control device, and an interface configured to couple the hardware to the hardware-control device, automatically outputting an identifier signal to a remote station in response to a connection between the hardware and the hardware-control device through the interface, automatically outputting a validation signal from the remote station upon receipt of the identifier signal from the support kiosk, troubleshooting the hardware from a remote location, and if the step of troubleshooting is unsuccessful, storing the hardware in a storage locker coupled to the IT support kiosk so that an IT technician may retrieve the hardware at a later time for in-person troubleshooting.

15. The method of claim 14, wherein the step of storing the hardware includes verifying that the user is authorized to store the hardware in the storage locker by outputting an identifier signal to a remote station and receiving a command signal from the remote station that causes the storage locker to open automatically.

16. The method of claim 15, wherein the IT support kiosk includes a plurality of storage lockers, at least one of the storage lockers housing replacement hardware, and the method further includes dispensing the replacement hardware to the user.

17. The method of claim 16, wherein the step of dispensing the replacement hardware further includes verifying that the user is authorized to receive the replacement device.

18. The method of claim 14, further comprising automatically presenting the remote IT support conference through a monitor fixed to the IT support kiosk.

* * * * *